Oct. 21, 1941.    W. F. BOLDT    2,259,794
BRAKING AND STEERING MECHANISM
Filed July 1, 1940    2 Sheets-Sheet 1
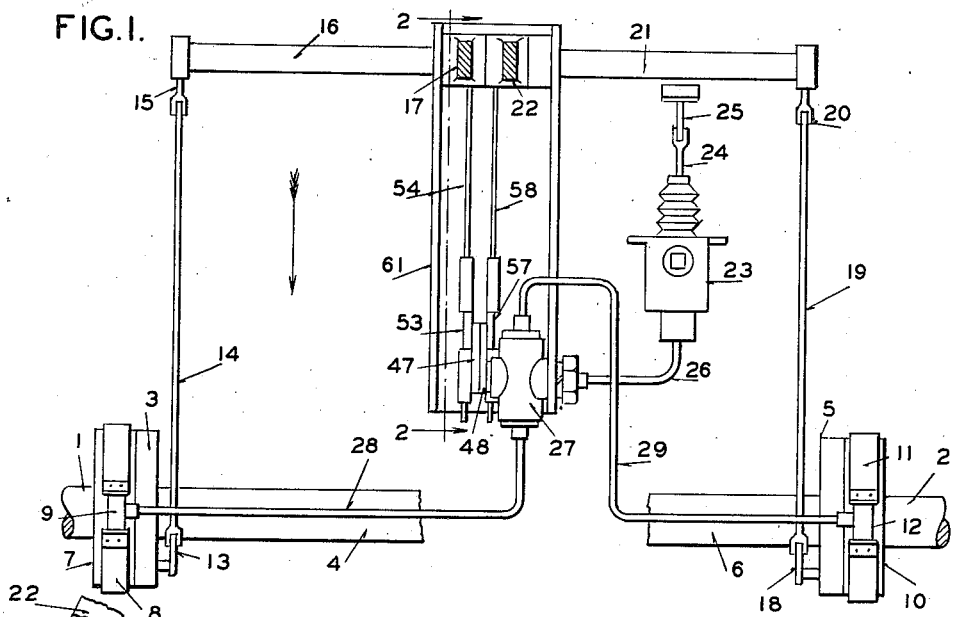
FIG.1.
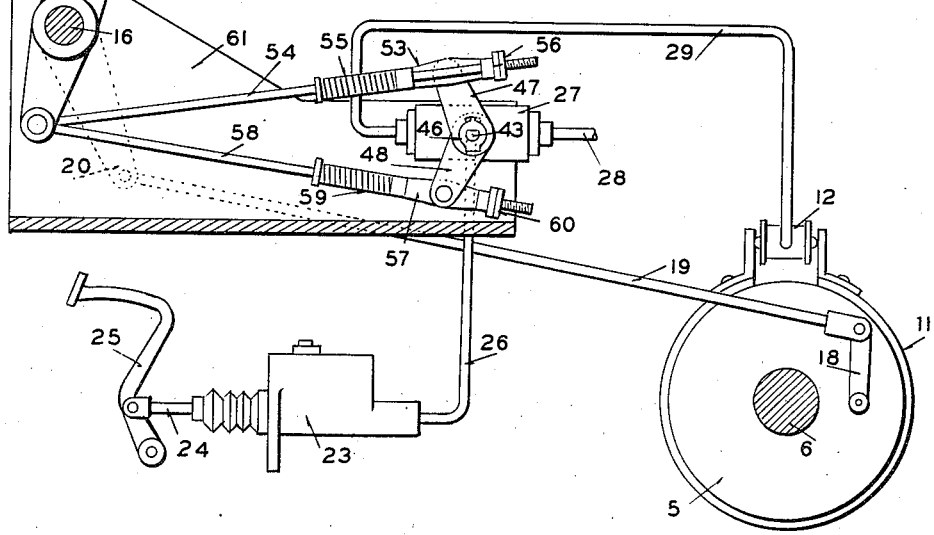
FIG.2.
INVENTOR
W. F. BOLDT
BY 
ATTORNEY Oct. 21, 1941.  W. F. BOLDT  2,259,794
BRAKING AND STEERING MECHANISM
Filed July 1, 1940  2 Sheets—Sheet 2
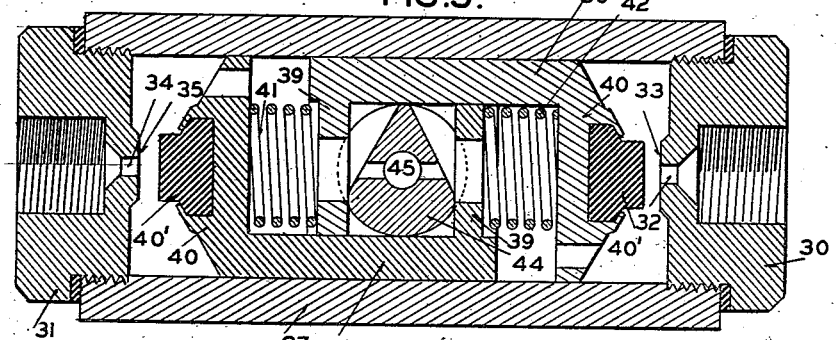
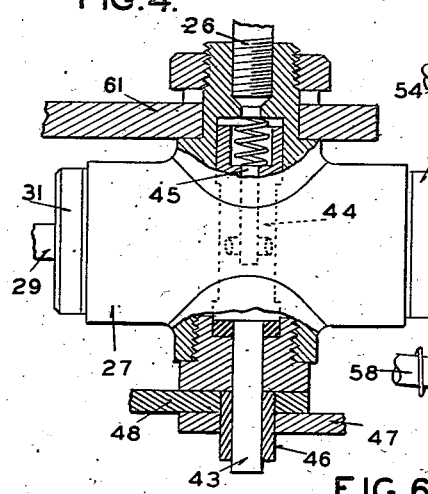
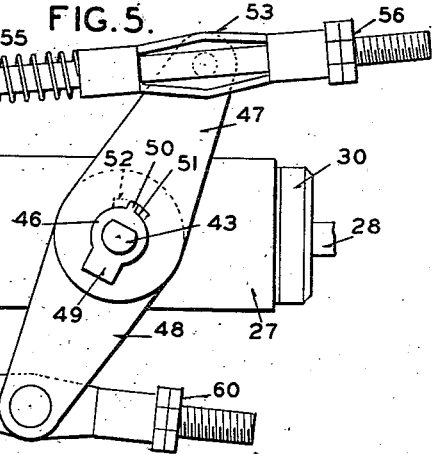
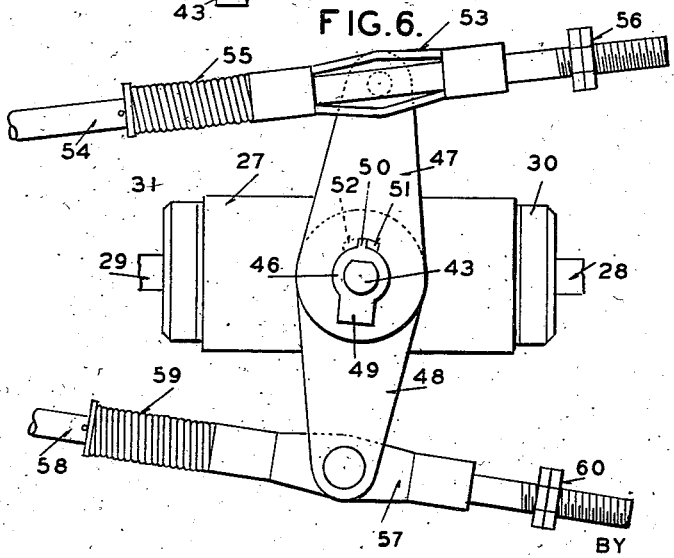
INVENTOR
W. F. BOLDT
BY
ATTORNEY Patented Oct. 21, 1941

2,259,794

UNITED STATES PATENT OFFICE 2,259,794

BRAKING AND STEERING MECHANISM

Werner F. Boldt, Clayton, Mo., assignor to Wagner Electric Corporation, St. Louis, Mo., a corporation of Delaware Application July 1, 1940, Serial No. 343,321

13 Claims. (Cl. 180—9.2)

My invention relates to a combined braking and steering apparatus and more particularly one for use on a tractor in which the steering is done by disengaging clutches and applying brakes to the driving members.

One of the objects of my invention is to so control a braking system for a tractor by the clutch disengaging means for the right and left hand driving members of the tractor that when the brakes are applied only the brake on the disconnected driving member will be applied.

Another object of my invention is to provide a hydraulic braking system for a tractor with valves for cutting off either the right or left hand brake and so control these valves by the clutch disengaging means for the driving members that the brakes can be employed to assist in properly steering the tractor.

Still another object of my invention is to so interconnect the valves with the clutch disengaging means that both clutches can be disengaged without affecting the normal operation of the brakes, thus permitting said brakes to act on both driving members simultaneously to slow or stop the tractor.

Other objects of my invention will become apparent from the following description taken in connection with the accompanying drawings in which Figure 1 is a stop view of a combined braking and steering mechanism for a tractor embodying my invention and showing the parts in their positions when the disconnecting clutches are engaged and the brakes released; Figure 2 is a side view of Figure 1 taken on the line 2—2; Figures 3 and 4 are sectional views showing the details of the control valves for the brakes; Figure 5 is a side view of the valves and operating connections with one lever in a clutch disengaging position; and Figure 6 is a view similar to Figure 4 with both levers in clutch disengaging position.

Referring to the drawings in detail, 1 and 2 indicates driving shafts leading to opposite sides of a tractor, as for example, one of the endless track laying type. These shafts are connected by suitable gearing and sprockets (not shown) to move the tracks in a well-known manner. The right hand driving shaft (forward end of the tractor being in the direction indicated by the arrow) is connected through a clutch 3 with a shaft 4 receiving power from the engine of the tractor. Similarly the left hand shaft is connected through a clutch 5 with a shaft 6 also connected to receive power from the engine. The driving shaft 1 has secured thereto a brake drum 7 with which cooperates a brake band 8 adapted to be applied to the drum by a fluid motor 9. The driving shaft 2 also has secured thereto a brake drum 10 with which cooperates a brake band 11 adapted to be applied to the drum by the fluid motor 12.

In accordance with my invention I provide improve means for controlling the clutches and brakes to thus enable the operator to properly control the tractor under all conditions. This improved means permits a clutch to be disengaged and the associated brake to be applied to thus retard or stop one of the tracks so that the tractor can swing or pivot around this track and turn the tractor in the desired direction. My improved means also permits both clutches to be disengaged and both brakes to be applied when such is found desirable.

As shown in the construction embodying my invention, the right hand clutch 3 is operated by a lever 13 connected by a link 14 to an arm 15 carried on the outer end of a cross shaft 16. The inner end of the shaft has secured thereto an operator-actuated lever 17 which may be either a pedal or a hand lever, the latter being shown. The left hand clutch 5 is operated by a similar structure comprising a lever 18 connected by a link 19 to an arm 20 on the outer end of a cross shaft 21. The cross shaft is rotated by a lever 22 positioned along side lever 17.

The means shown to actuate the brakes is a hydraulic actuating system although other equivalent structure can be employed if desired. The pressure source is a master cylinder device 23 of well-known construction, its piston (not shown) being actuated by a piston rod 24 and a pedal 25 conveniently positioned for actuation by the tractor operator. The outlet of the master cylinder communicates by means of a conduit 26 with a casing 27 containing valve structure to be described. A branch conduit 28 leads from the casing to the fluid motor 9 of the right hand brake and a second branch conduit 29 leads from the casing to the fluid motor 12 of the left hand brake. Thus it is seen that if the valve structure in casing 27 does not prevent fluid from being transmitted to the branch conduits, both brakes can be applied by operation of the master cylinder device.

The valve structure in casing 27 is an important part of my invention. As shown in Figures 3 and 4, the casing is cylindrical in form and closed at its end by the plugs 30 and 31 to which the conduits 28 and 29, respectively, are connected. The opening 32 in plug 30 has associated therewith a valve seat 33 and the opening 34 in plug 31 has associated therewith a valve seat 35. Positioned within the casing are two similar slidable valve elements 36 and 37 each of U-shaped cross section so as to provide a rear portion 39 and a forward portion 40. The valve elements are in overlapping relation with the rear portion of one interposed between the head and rear portion of the other. The head portions of the valve elements carry rubber members 40' for engaging the seats 33 and 35. A spring 41 is interposed between the rear portion 39 of valve elements 36 and head portion 40 of valve element 37 and a like spring 42 is interposed betweeen the rear portion of valve element 37 and the head portion of valve element 36.

A shaft 43 extends into the casing between the end portions of the valve elements and is formed to provide a V-shaped cam 44. The cam in its normal position shown in Figure 3 holds the valve elements in such positions that they are disengaged from their respective seats. The shaft 43 is formed with a passage 45 to permit fluid to enter the casing from conduit 26 which is connected to the casing at the inner end of the shaft.

The exterior end of the shaft has secured thereto a sleeve 46 upon which are mounted arms 47 and 48 held in place by a lug 49 on the sleeve. The connection between the sleeve and the arms comprises a shoulder or ridge 50 on the sleeve positioned in oversize notches 51 and 52 in the bearing portions of arms 47 and 48, respectively, whereby limited lost motion is present between the arms and sleeve. The outer end of arm 47 is pivotally connected to a sleeve 53 mounted on a rod 54 connected to the right hand clutch control lever 17 previously described. The sleeve 53 is biased by a spring 55 into engagement with adjusting nuts 56 on the end of the rod. This construction permits the rod to have relative movement in one direction with respect to the sleeve when the spring is compressed. Similarly the outer end of arm 48 is pivotally connected to a sleeve 57 mounted on a rod 58 connected to the left hand clutch control lever 22. A spring 59 biases the sleeve against adjusting nuts 60 on the end of the rod. The levers 17 and 22 and the valves are all carried by a single support 61.

In operation, when the clutches are engaged, the levers 17 and 22 are in their forward positions and the parts are as shown in Figures 1 and 2. The arms 47 and 48 are in positions such that the arm 47 engages one side of shoulder 50 on sleeve 46 and the arm 48 engages the other side of said shoulder to thereby maintain the shaft 43 and cam 44 in their normal or central position whereby both valve elements 36 and 37 are in open position. Under these conditions, if the tractor is moving both brakes can be applied simultaneously to retard the tractor if desired. If it should be desired to turn the tractor to the right, the right hand lever 17 will be pulled rearwardly. This will disengage the right hand clutch 3 and cause arm 47 to be moved in a clockwise direction. The movement of the arm to a vertical position will result in lost motion because of the oversize notch 51, and subsequent movement will cause rotation of shaft 43 and cam 44. The arm 48 will not be turned due to its oversize notch 52. The cam will now be so positioned that the spring 42 can be effective to move valve element 36 to closed position, thereby cutting off communication between the master cylinder and the left hand brake motor 12. If now the master cylinder is operated by the foot pedal, the motor 9 only will be operated to apply the right hand brake, thereby retarding or stopping the right hand track. With power still being applied to the left hand track the tractor will pivot or swing about the right hand track and thus turn the tractor to the right.

If it should be desired to turn the tractor to the left, the left hand lever 22 is pulled back. This will disengage the left hand clutch and rotate the arm 48 in a counter-clockwise direction. After the lost motion due to notch 52 has been taken up, the cam 44 will be rotated in a counter-clockwise direction, thereby permitting the valve element 36 to be closed by action of spring 41. The valve element 37 will continue to be held open by the cam. When the master cylinder is now operated only the left hand brake will be applied, thereby retarding or stopping the left hand track to make the left turn desired.

If it is desired to stop the tractor, both levers 17 and 22 are pulled back to disengage both clutches. This will cause both arms 47 and 48 to be rotated to take up the lost motion due to their notches 51 and 52. When this lost motion is taken up, the rotation of the levers will stop since they oppose each other. No movement of shaft 43 and cam 44 will take place. If the levers 17 and 22 are pulled backward further than that necessary to take up the lost motion between the arms and the shaft, the springs 55 and 59 will be compressed and the rods 54 and 58 will move relatively to the sleeves 53 and 57. With both valve elements remaining open, both brakes can be applied simultaneously.

If a condition arises where it is desired to steer the tractor when both clutches are engaged and both brakes are being applied, this is accomplished by pulling back the desired clutch operating lever, then quickly releasing the brakes and again actuating the master cylinder. The disengaging of a clutch will close the valve element leading to the brake on the opposite side. When the brakes are again applied, the fluid under pressure can only be transmitted to apply the brake on the same side as the disengaged clutch. It is to be noted that the valve elements when seated do not prevent fluid under pressure from returning to the master cylinder to release the brakes since the valve elements move off their seats in the direction of flow of fluid back to the master cylinder.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking and steering mechanism, two members adapted to be driven from a source of power, means for disconnecting each member from its source of power, means for operating each disconnecting means independently a brake for each member, means for applying the brakes independently of the means for operating the disconnecting means, means associated with the brake applying means for preventing the brake either of said members from being applied when the applying means is operated, means operable by the operating means for disconnecting one member for causing operation of the means for preventing the brake of the other member from being applied, and means operable by the operating means for disconnecting the other member for causing operation of the means for preventing the brake of the first member from being applied.

2. In braking and steering mechanism, two members adapted to be driven from a source of power, means for disconnecting each member from its source of power, means for operating each disconnecting means independently, a brake for each member, means for applying the brakes independently of the means for operating the disconnecting means, means associated with the brake applying means for preventing the brake of either of said members from being applied when the applying means is operated, means operable by the operating means for disconnecting one member for causing operation of the means for preventing the brake of the other member from being applied, means operable by the operating means for disconnecting the other member for causing operation of the means for preventing the brake of the first member from being applied, and means for causing the two last named means from being operative when the operating means for the disconnecting means of both members are operated.

3. In braking and steering mechanism, two members adapted to be driven from a source of power, individually operated means for disconnecting said members from said source of power, a brake for each member, means for simultaneously applying said brakes, and means associated with said brake applying means and connected to be controlled by each of said individually operated means for preventing the application of the brake on one member by the applying means when the other member is disconnected from the source of power.

4. In braking and steering mechanism, two members adapted to be driven from a source of power, clutches for disconnecting said members, means for causing the clutches to be disengaged either separately or simultaneously, a brake for each member, means for applying both brakes and comprising a single operated element, means associated with the applying means for preventing either brake from being applied by the applying means, means operable when the clutch for one member is disengaged by its disengaging means for operating the means preventing the brake for the other member from being applied, and means operable when the clutch for the other member is disengaged by its disengaging means for operating the means preventing the brake for the first named member from being applied.

5. In braking and steering mechanism, two members adapted to be driven from a source of power, clutches for disconnecting said members, means for causing the clutches to be disengaged either separately or simultaneously, a brake for each member, means for applying the brakes and comprising a single operated element, means associated with the applying means for preventing either brake from being applied by the applying means, means operable when the clutch for one member is disengaged by its disengaging means for operating the means preventing the brake for the other member from being applied, means operable when the clutch for the other member is disengaged by its disengaging means for operating the means preventing the brake for the first named member from being applied, and means for permitting both brakes to be applied simultaneously when both clutches are disengaged by their disengaging means.

6. In braking and steering mechanism, two members adapted to be driven from a source of power, clutches for disconnecting said members, means for causing the clutches to be disengaged either separately or simultaneously, a brake for each member, fluid pressure actuated means for operating the brakes, two valves, each preventing fluid under pressure from being transmitted to apply a brake, means operable when one of said clutches is disengaged for closing one valve, and means operable when the other of said clutches is disengaged for closing the other valve.

7. In braking and steering mechanism, two members adapted to be driven from a source of power, clutches for disconnecting said members, means for causing the clutches to be disengaged either separately or simultaneously, a brake for each member, fluid pressure actuated means for operating the brakes, two valves, each preventing fluid under pressure from being transmitted to apply a brake, means operable when one of said clutches is disengaged for closing one valve, means operable when the other of said clutches is disengaged for closing the other valve, and means for preventing either of said valves from being closed when both clutches are disengaged to thereby permit both brakes to be applied simultaneously.

8. In braking and steering mechainsms for a track laying tractor having right and left members adapted to be driven from a source of power, clutches for disconnecting said members, a lever connected to disengage each clutch, a brake for each member, fluid pressure means for actuating the brakes including a common source of pressure, two valves, each preventing fluid under pressure from being transmitted to apply a brake, means operable when the lever for the clutch of the left member is operated to disengage it for closing the valve for the brake of the right member, means operable when the lever for the clutch of the right member is operated to disengage it for closing the valve for the brake of the left member, the said operating means being so associated with each other and the valves that when both levers are operated to cause both clutches to be simultaneously disengaged neither valve will be in closed position.

9. In braking and steering mechanism, two members adapted to be driven from a source of power, clutches for disconnecting said members, means for causing the clutches to be disengaged either separately or simultaneously, a brake for each member, fluid pressure actuated means for operating the brakes, valve means for preventing fluid under pressure from being transmitted to apply the brakes and comprising two valve elements, a rotatable cam for selectively causing either valve element to be closed, means for rotating said cam in one direction to close one valve and prevent fluid pressure from being transmitted to the brake of one member when the clutch of the other member is disengaged, and means for rotating the cam in the opposite directions to close the other valve and prevent fluid pressure from being transmitted to the brake of the other member when the clutch of the first member is disengaged.

10. In braking and steering mechanism, two members adapted to be driven from a source of power, clutches for disconnecting said members, means for causing the clutches to be disengaged either separately or simultaneously, a brake for each member, fluid pressure actuated means for operating the brakes, valve means for preventing fluid under pressure from being transmitted to apply the brakes and comprising two valve elements, a rotatable cam for selectively causing either valve element to be closed, means for rotating said cam in one direction to close one valve and prevent fluid pressure from being transmitted to the brake of one member when the clutch of the other member is disengaged, means for rotating the cam in the opposite direction to close the other valve and prevent fluid pressure from being transmitted to the brake of the other member when the clutch of the first member is disengaged, and means including lost motion connections between each clutch disengaging means and the cam for permitting both clutches to be in disengaged position without closing either valve.

11. In apparatus of the class described, a fluid pressure system having a source of pressure and two fluid pressure actuated motors in communication therewith by conduits, valve means associated with the conduits for preventing fluid under pressure from being transmitted to the motors and comprising a casing, two axially aligned movable valve elements in said casing, a rotatable cam positioned between the elements for selectively controlling the closing of said valve elements by rotation in opposite directions, and means for rotating said cam in opposite directions.

12. In apparatus of the class described, a fluid pressure system having a source of pressure and two fluid pressure actuated motors in communication therewith by conduits, valve means associated with the conduits for preventing fluid under pressure from being transmitted to the motors and comprising a casing provided with opposed valve seats, a movable valve element for cooperating with each seat, said valve elements being in axial alignment, spring means for biasing said valve elements toward seated positions, a rotatable cam positioned between and engageable with both valve elements to normally hold them unseated and so constructed and associated therewith that when rotated in one direction one valve element will be caused to be closed and when rotated in the opposite direction the other valve element will be closed, and means for rotating said cam in opposite directions.

13. In apparatus of the class described, a fluid pressure system having a source of pressure and two fluid pressure actuated motors in communication therewith by conduits, valve means associated with the conduits for preventing fluid under pressure from being transmitted to the motors and comprising a casing provided with opposed valve seats, a movable valve element for cooperating with each seat, spring means for biasing said valve elements toward seated positions, a rotatable cam engageable with both valve elements to normally hold them unseated and so constructed and associated therewith that when rotated in one direction one valve element will be caused to be closed and when rotated in the opposite direction the other valve element will be closed, two levers connected to rotate the cam, and means for rotating one lever in one direction and the other lever in the opposite direction, said levers having lost motion movement with respect to the cam and from their normal positions prior to rotation of said cam.

WERNER F. BOLDT.